United States Patent
Sada et al.

(10) Patent No.: US 6,818,242 B2
(45) Date of Patent: Nov. 16, 2004

(54) PRODUCTION METHOD OF CHINESE FRIED MEAT DUMPLINGS

(75) Inventors: Morihiro Sada, Kawasaki (JP); Sachiyo Yoshida, Kawasaki (JP); Eri Hoshikawa, Kawasaki (JP); Tomoyuki Hirota, Kawasaki (JP); Shundo Harada, Kawasaki (JP); Chiaki Nosaka, Kawasaki (JP); Takeshi Nishinomiya, Oura-gun (JP); Hirofumi Terazaki, Oura-gun (JP); Masata Mitsuiki, Oura-gun (JP); Takashi Futatsugi, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 349 days.

(21) Appl. No.: 10/192,513

(22) Filed: Jul. 11, 2002

(65) Prior Publication Data

US 2003/0031770 A1 Feb. 13, 2003

(30) Foreign Application Priority Data

Jul. 11, 2001 (JP) ........................................ 2001-210525

(51) Int. Cl.[7] .............................................. A23L 1/01
(52) U.S. Cl. ....................... 426/523; 426/506; 426/510; 426/511
(58) Field of Search ................................. 426/438, 506, 426/510, 511, 523

(56) References Cited

FOREIGN PATENT DOCUMENTS

| JP | 62-262973 | * 11/1987 |
| JP | 06-245740 | 9/1994 |
| JP | 06-277013 | 10/1994 |
| JP | 07-023868 | 1/1995 |
| JP | 08-038367 | 2/1996 |
| JP | 08-182623 | 7/1996 |
| JP | 09-215605 | 8/1997 |
| JP | 10-248717 | 9/1998 |
| JP | 10-271978 | 10/1998 |
| JP | 11-056313 | 3/1999 |
| JP | 11-309071 | 11/1999 |

* cited by examiner

*Primary Examiner*—George C. Yeung
(74) *Attorney, Agent, or Firm*—Oblon, Spivak, McClelland, Maier & Neustadt, P.C.

(57) ABSTRACT

A production method of Chinese fried meat dumplings includes loading meat dumplings on a conveyer, steaming the meat dumplings on the conveyer, and frying the meat dumplings by increasing a temperature of the conveyer from 50° C. to 200–280° C. in 1–8 minutes as the conveyer moves the meat dumplings toward downstream.

20 Claims, 2 Drawing Sheets

PRODUCTION METHOD OF CHINESE FRIED MEAT DUMPLINGS

CROSS-REFERENCE TO RELATED APPLICATIONS

The present application claims priority to Japanese Patent Application No.2001-210525, filed Jul. 11, 2001. The contents of that application are incorporated herein by reference in their entirety.

BACKGROUND OF THE INVENTION

1. Field of the Invention

The present invention relates to a production method useful in producing, on an industrial scale, Chinese fried meat dumplings.

2. Discussion of the Background

The Chinese meat dumpling is a popular Chinese food among Japanese, and is marketed as frozen food in large numbers. The Chinese meat dumpling is originated in China, and in China, it is usually steamed or served in soup. In Japan, on the other hand, what is generally called "Chinese fried meat dumpling" is preferred. The manual cooking of Chinese fried meat dumplings in top Chinese restaurants is characterized by the following two points. First, wrappings of 1 mm or more in thickness are formed manually from dough having a large water content (45% or more). Second, meat dumplings formed by using such wrappings are fried in the following manner. After meat dumplings have been arranged on a heated pan, a sufficient amount of boiling water is added to the pan and the meat dumplings are boiled. Then, remaining hot water is removed from the pan and the meat dumplings are fried from their bottom surfaces sticking to the pan. Each Chinese meat dumpling that has been cooked by the above method has features that the side portion and the "ear" portion, i.e., the folded portion, have absorbed a sufficient amount of water and thereby gelatinized sufficiently to provide a soft-rice-cake-like texture, and that the bottom surface portion has been fried after being gelatinized sufficiently to have a clear fried surface and a dark brown color for a crunchy texture when eaten.

On the other hand, to produce a large number of Chinese meat dumplings industrially, a method in which meat dumplings are made by a shaping machine, using circular pieces of dough obtained by punching a rolled noodle band is generally employed. In this method, where an automatic dumpling shaping machine is used, it is difficult to use dough containing much water as used in the manual cooking. Therefore, in general, wrappings as thin as about 0.7 mm are produced from dough having a small water content (about 35%). To produce Chinese fried meat dumplings industrially, it is difficult to boil as performed in kitchens. Therefore, an ordinary procedure is to steam and fry meat dumpling. However, the wrappings of the meat dumplings produced by using dough having a small water content cannot absorb a sufficient amount of water when they are merely steamed. Since sufficient gelatinization cannot be attained, the bottom portion of each fried meat dumpling is not given a clear fried surface. In particular, the ear portion does not have a soft-rice-cake-like texture.

Conventionally, various measures have been taken to solve the above problems. For example, in Japanese Patent Laid-Open No. 245740/1994, a method in which meat dumplings are fried after emulsion consisting of water, fat, an emulsifier, grain powder, protein, seasonings, etc., has been applied to the bottom surfaces of the meat dumplings is employed to provide a texture, a color and a flavor that are close to the ones obtained immediately after frying in accordance with the manual cooking. However, lack of the sufficient gelatinization which can be obtained by in boiling water, this method is an insufficient measure for solving the above problems.

Japanese Patent Laid-Open No. 23868/1995 discloses a method in which meat dumplings are steamed and then baked in a covered pan. However, this method cannot sufficiently soften the wrappings of the meat dumplings.

Japanese Patent Laid-Open No. 277013/1994 discloses a method for making the folded portion of the wrapping of each steamed meat dumpling as soft as the portion in contact with its filling. The inside of a steaming room is heated while being supplied with steam. Showers are provided in the top portion of the steaming room and water is supplied to the top surfaces of meat dumplings with a certain timing. In this manner, the folded portion of each meat dumpling is made as soft as the portion in contact with its filling. However, in this method, the wrappings of the meat dumplings do not receive a sufficient amount water and hence cannot obtain sufficient gelatinization obtained by boiling in water.

Japanese Patent Laid-Open No. 38367/1996 discloses a method in which, to prevent the top surfaces of foods from being heated excessively, a frying machine for Chinese meat dumplings and fried udon noodles (thick Japanese white noodles) is equipped with a cooling water tank on its top surface. Although this method is effective in preventing the top surfaces of meat dumplings from being fried, it cannot boil and gelatinize the wrappings sufficiently in their entireties before frying.

Japanese Patent Laid-Open No. 182623/1996 discloses a method that is directed to relatively small, batch-type kitchen apparatuses and in which the frying time and temperature of a meat dumpling frying pan are controlled by a microcomputer to obtain a constant fried surface color. However, this method cannot be applied to a continuous, industrial-scale boiling and frying operation.

Japanese Patent Laid-Open No. 248717/1998 discloses a method that is directed to home cooking apparatuses for properly defrosting and frying frozen meat dumplings and in which frozen meat dumplings and water are put in an apparatus and heated together, whereby boiling and frying are performed. Although this method is suitable for boiling and frying frozen meat dumplings at home, it cannot be used on an industrial scale.

Japanese Patent Laid-Open No. 56313/1999 discloses a method in which a thickening liquid accommodated in a thickening liquid accommodating section of a tray for meat dumplings and meat dumplings accommodated in a pieces accommodating section are frozen together and, at the time of frying, they are placed on a heated iron plate with the thickening liquid down. This method makes it possible to cook meat dumplings sticking to a pan with a flat fried surface and cause a superior texture when eaten. Although this method is suitable for frying in restaurants or take-out meat dumplings at home, it cannot be used on an industrial scale.

Japanese Patent Laid-Open No. 271978/1998 discloses a method for providing a good texture of typical Chinese fried meat dumplings by heating meat dumplings again immediately before eating. In this method, cooking oil is applied to the surfaces of respective fried meat dumplings. However, this method cannot reproduce, on an industrial scale, the meat dumpling cooking method of Chinese chefs.

Japanese Patent Laid-Open No. 309071/1999 discloses a method for obtaining uniform frying results and uniform scorched parts in an electric heater type frying machine for meat dumpling. In this method, electric heaters, i.e., pipe heaters, are disposed in grooves of an iron plate provided in a main body case so as to arrange the heaters in parallel at a regular interval in approximately the same number as the number of columns the meat dumplings are arranged. Cooking is finished when the temperature of the iron plate has reached a preset value. However, this method is directed to small-scale cooking apparatuses and cannot be applied to industrial-scale, continuous cooking facilities.

In the above methods, it is still difficult to reproduce the Chinese meat dumplings prepared by chefs on an industrial scale.

SUMMARY OF THE INVENTION

According to one aspect of the present invention, a production method of Chinese fried meat dumplings includes loading meat dumplings on a conveyer, steaming the meat dumplings on the conveyer, and frying the meat dumplings by increasing a temperature of the conveyer from 50° C. to 200–280° C. in 1–8 minutes as the conveyer moves the meat dumplings toward downstream.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
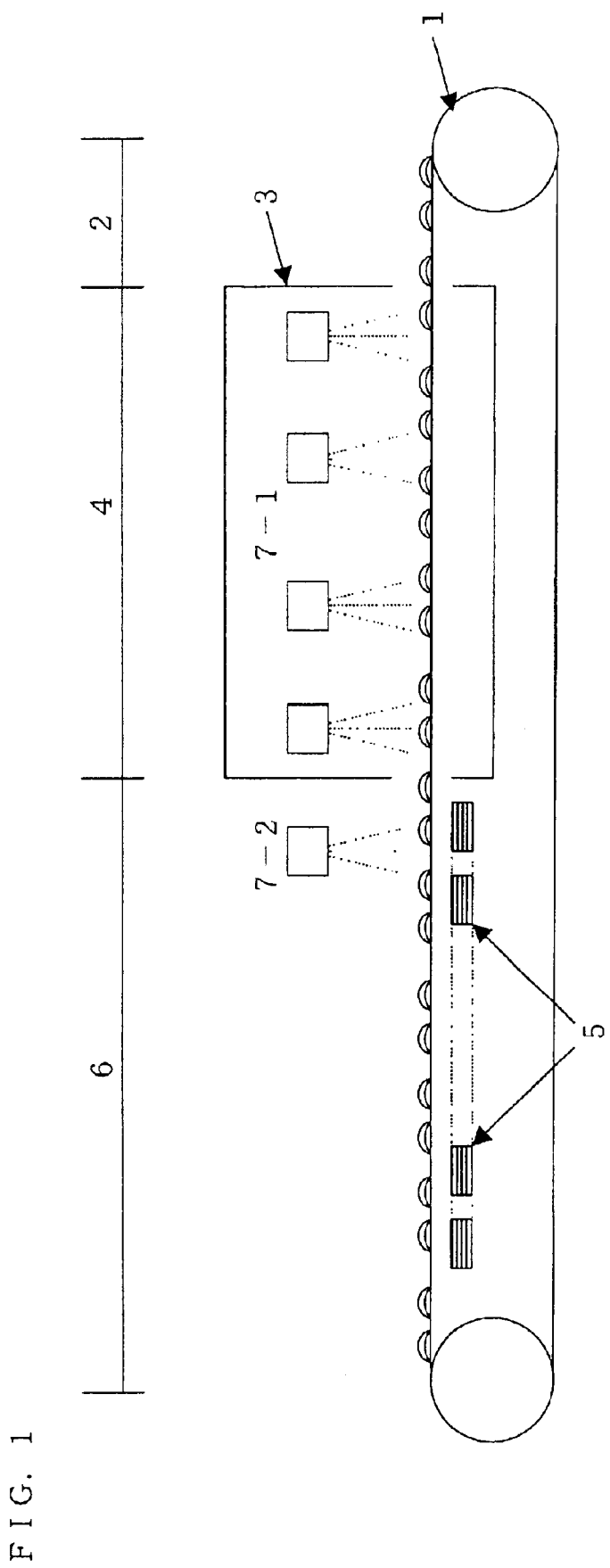
FIG. 1 shows a belt-conveyer-type Chinese fried meat dumpling production apparatus according to an embodiment of the present invention.

The preferred embodiments will now be described with reference to the accompanying drawings, wherein like reference numerals designate corresponding or identical elements throughout the various drawings.

A production method according to embodiments of the present invention will be hereinafter described in detail. In this exemplary method, Chinese fried meat dumplings are produced continuously through a steaming step and a frying step, using frying plates formed on a conveyer.

First, a production method of meat dumplings will be described. In an exemplary production of Chinese fried meat dumplings on an industrial scale according to the present invention, meat dumplings are shaped by using a meat dumpling shaping machine. In contrast to the manual cooking, the production of meat dumplings with a meat dumpling shaping machine uses dough having a small water content (about 35%) because of the matching between a noodle band and the machine. The wrappings of meat dumplings produced from such noodles having a small water content do not absorb a sufficient amount of water when the meat dumplings are merely steamed in saturated vapor. As a result, the gelatinization of starch is about 35%, and the wrappings are hard to bite off and causes a tough texture when eaten. To obtain a good texture in the meat dumplings produced from noodles having a small water content, during the steaming step, the wrappings are caused to contain water at a proportion of 40% or more, preferably 45% or more, even more preferably 50% or more, and that the gelatinization of the wrappings after the steaming be 60% or more, preferably 70% or more, even more preferably 80% or more. However, since the bottom surface portions of the meat dumplings are in contact with the surface of the frying conveyer when they are steamed in the steaming step, it is difficult to cause the bottom surface portions to absorb a sufficient amount of water. For the bottom surface portions to absorb a sufficient amount of water, it is preferable to supply water only to the bottom surface portions in advance by bringing the bottom surface portions of the meat dumplings as produced by the machine shaping in contact with hot water at 50–90° C. for 20–60 seconds.

Spraying water is effective as a method for the wrappings of meat dumplings to absorb water effectively in the steaming step. However, according to this embodiment of the present invention, hot water whose temperature is 50° C. or more, preferably 70–95° C. when it reaches the surfaces of the meat dumplings in spraying is used. Cool water whose temperature is room temperature to a temperature lower than 50° C. is not preferable because the wrappings cannot absorb the water at a sufficiently high rate, and the water has a strong tendency to elute starch from the wrappings of the meat dumplings. The term "water temperature" as used herein means the temperature of water when it reaches the surfaces of the meat dumplings in spraying. Therefore, if the temperature of water can be increased to a value within the above range by the ambient vapor while the water is jetted and scattered from a spray nozzle, the temperature of water supplied to the spray nozzle may be lower than 50° C.

Also, with regard to the amount of water sprayed, if the amount of water sprayed is too small, the wrappings cannot absorb a sufficient amount of water. On the other hand, if the amount of water sprayed is too large, starch may be eluted from the wrappings. Thus, the amount of water sprayed on every 1 cm² area of the wrapping of a meat dumpling is 0.01–0.1 ml/s, preferably 0.02–0.05 ml/s, even more preferably about 0.03 ml/s. As for an exemplary method of measuring the amount of water sprayed, liquid is collected in a 85 mm-diameter laboratory dish for a predetermined time and a weight of the collected liquid is measured and divided by the bottom area of the laboratory dish and the spray time, whereby an amount of water sprayed on every 1 cm² area every second is calculated. This value is employed as an amount of water sprayed on every 1 cm² area of the wrapping of a meat dumpling. Although the spraying can be performed continuously, it is preferable that the spraying be started immediately after the start of steaming and be performed intermittently. Water is preferably sprayed for three seconds each time at intervals of 30 seconds. To effectively spray a minimum amount of water on the meat dumplings in this manner, the water droplet diameter may be also taken into account. A method of passing meat dumplings through a thin film of dropping water is not preferable because a large amount of water is needed. A method of pouring water on the meat dumplings with a watering can cannot apply water uniformly to the wrappings of the meat dumplings because of large water droplets. To apply the minimum amount of water uniformly to the wrappings of the meat dumplings, water is sprayed on the meat dumplings in mist using a pressure-type spray nozzle. A proper pressure of the pressure-type spray nozzle is 50 kPa (0.5 kg/cm²) or more, though it depends on the flow rate and the nozzle diameter. By spraying a necessary amount of hot water to the meat dumplings in accordance with the water absorption speed of the wrappings of the meat dumplings, the wrappings of the meat dumplings can absorb water to achieve a water content of 58% in a steaming time of four minutes, a time necessary to heat-cook the fillings of the meat dumplings and achieve the gelatinization of about 90%. Thus, even with the meat dumplings produced from noodles having a small water content, the meat dumplings provide a soft-rice-cake-like texture equivalent to the manually cooked meat dumplings.

Next, the step of frying the meat dumplings will be described. As for the frying step, the state of how the meat dumplings are sticking to the frying plate and the speed of temperature increase of the frying plate may be taken into account in order to uniformly fry the bottom surfaces of the meat dumplings. Immediately after steamed on the frying plate, the meat dumplings are made to stick to the frying plate, and the meat dumplings should be removed from the frying plate easily after being fried. This is because unless the bottom surface of each meat dumpling sticks to the frying plate at the start of frying, part of the bottom surface separates from the frying plate during the frying and causes uneven frying. This tends to cause only the periphery of the bottom surface of each meat dumpling being fried thoroughly and cause a lip-shaped frying result, only a central portion of the bottom surface is fried thoroughly, or uneven frying in dots. Conversely, if the meat dumplings are not removed from the frying plate easily after being fried, the bottom surfaces of some meat dumplings may be broken off. To obtain a preferable frying result, the meat dumplings should stick to the frying plate strongly with a sticking force of about 100 g per dumpling at the start of frying and that they stick to the frying plate weakly with a sticking force of 10–30 g or, preferably, separate from the frying plate automatically, though the proper sticking force somewhat varies depending on the size and weight of the meat dumplings. To properly control the sticking force between the meat dumplings and the frying plate, not only the surface of the frying plate (described later) but also the speed of temperature increase of the frying plate may be taken into account in the frying step.

The temperature of the frying plate is equal to about 100° C. immediately after coming out from the steaming step. The temperature of the frying plate thereafter increases at a rate of 0.3–2° C./s. It is preferable that the temperature of the frying plate increases at a constant rate of about 1° C./s. It is even preferable that the temperature of the frying plate increases initially at 0.5–1° C./s and increases, in the latter half of the frying step, at 1–2° C./s stepwise or in a quadratic-function-like manner. The temperature of the frying plate preferably reaches 200–280° C., more preferably 230–270° C., even more preferably 240–260° C. in 2–6 minutes, preferably in 2.5–5 minutes, even more preferably in 3–4 minutes.

In the frying step, some of the water in the side portion and the ear portion of each meat dumpling is evaporated by heat applied during the heating. If Chinese fried meat dumplings thus produced are frozen and then defrosted with, particularly, a microwave oven, further evaporation of water occurs during the defrosting, and particularly the ear portion is not likely to provide a good texture any more. To allow the ear portion of a frozen fried meat dumpling to provide, even after microwave-oven defrosting, a soft-rice-cake-like texture as obtained immediately after the frying, it is effective to maintain the water content of the ear portion even during the frying step by spraying hot water or cool water on the ear portion intermittently in the frying step. It is preferable that the amount of water sprayed on every 1 $cm^2$ area be 0.01–0.1 ml/s. The number of sprays in the frying step depends on the length and speed of the conveyer. One to four sprays may be intermittently performed.

Next, an exemplary apparatus according to the present invention will be described. In the present invention, a conveyer is used, for example, as a means for producing Chinese fried meat dumplings continuously. The conveyer may be either a belt conveyer or a plate conveyer. As for the belt conveyer, a belt generally called a "steel belt conveyer" is used. The steel belt conveyer is produced by connecting a steel band into a ring shape and is driven by pulling both its ends by pulleys. The thickness of the steel material to be used for producing a steel belt conveyer should be determined in consideration of the strength of the belt and the driving performance, and it is proper to use a common steel band having a thickness of 0.8–1.5 mm, preferably 1 mm. The plate conveyer is a mechanism of driving frying plates continuously. Examples of such a driving mechanism are a mechanism in which frying plates are arranged on and fastened to drive chains at both ends or both ends and intermediate positions of each frying plate. The frying plates are driven together with the drive chains. The frying plates arranged on the drive chains may be transported in such a manner that transport nails provided on the drive chains are hooked on the frying plates, and the frying plates may be mounted on a roller conveyer and transported by rotation of drive rollers. In the plate conveyer, it is not necessary to bend the frying plates during driving, and hence a thick metal plate may be used to prevent the conveyer from warping due to its own weight or thermal distortion. The thickness should be 2–10 mm, preferably 3–6 mm.

The material of the frying plates may also be taken into account. Resin materials such as Teflon are not preferable because they are low in mechanical strength though high in corrosion resistance, and they cannot provide high thermal conductivity as a metal. Also, they are low in heat resistance (in terms of temperature), and tend to cause uneven frying because they do not allow the meat dumplings to stick to them sufficiently. To obtain proper thermal conductivity, heat resistance, adhesion, and releasability, metal frying plates are used according to this embodiment of the present invention. No specific limitations are imposed on the kind of metal. However, a metal is selected in consideration of the thermal conductivity, mechanical strength, workability, corrosion resistance, economy, and whether it exhibits magnetism (where electromagnetic induction heating is employed). Although carbon steel is preferred in terms of the thermal conductivity, magnetism, mechanical strength, workability, and economy, it is insufficient in corrosion resistance. Therefore, in the steel belt conveyer, it is preferable to use a belt sheet of martensitic stainless steel, two-layer stainless steel, or precipitation hardening stainless steel. In the plate conveyer, it is preferable to use a single sheet of martensitic stainless steel, two-layer stainless steel, or precipitation hardening stainless steel or cladding steel in which an austenite stainless steel sheet or a titanium sheet is clad to both surfaces of a carbon steel sheet as a base material.

Where frying plates made of any of the above metal materials are used, their surface roughness may be taken into account in obtaining the bottom surface of each meat dumpling having a good frying result and readily releasing the meat dumplings, i.e., high releasability after frying. Adjusting the surface roughness of the frying plates is an effective and preferable method for obtaining the high releasability. The surface roughness can be represented by the arithmetic mean roughness value Ra, that is, the average of the absolute values of deviations of a measurement line from an average line of a sectional curve of a surface. It is preferable that the surface roughness be 1–5 µm in terms of Ra. With a smoothly polished surface having surface roughness of 1 µm or less, fried meat dumplings are kept stuck to the frying plates and cannot be separated from the frying plates. Conversely, surface roughness of 5 µm or more is not preferable because sufficient adhesion is not obtained immediately after the start of frying, hence frying partially or in dots. To obtain a uniform fried surface, the surface roughness of the frying plate is preferably 1.2–5 µm, more preferably 1.5–3.5 µm, even more preferably 2–3 µm. A metal surface that has been finished so as to have such surface roughness provides proper adhesion and releasability when cooking oil is applied to the surface, and heating the frying plate without placing any food causes the oil to stick to the surface. As a result, the bottom surface of each meat dumpling sticks to the frying plate and is fried, thereby giving an almost uniform frying appearance. No specific limitations are imposed on the method for obtaining such preferable surface roughness on the metal plate surface. Sandblasting, acid cleaning, polishing with coarse abrasive grains, etc. and combinations thereof may be used, for example.

Next, exemplary heating methods in the steaming step and the frying step will be described. In the steaming step, a method of blowing saturated vapor may be used. Specifically, a tunnel-like steaming room covering a steel belt conveyer or a plate conveyer may be provided such that the conveyer passes through the steaming room. Saturated vapor is blown into the steaming room, whereby the meat dumplings on the conveyer are steamed. In the frying step, the frying plates are heated when the conveyer is not covered with a tunnel-like cover, whereby the bottom surface of each meat dumpling is fried. The method for heating the frying plates may be direct heating with gas fire, blowing burning gas or a hot wind, or the like. However, for heating only the frying plates without diffusing heat to the surroundings and for controlling the temperature to a prescribed value, a method in which heating coils are provided under the frying plates of the conveyer and heating is performed by electromagnetic induction may be used. The method for spraying hot water on the ear portions in the frying step may be basically similar to the one used in the steaming method. However, to avoid spraying water to the frying conveyer unnecessarily, it is preferable to detect the positions of the meat dumplings and spray water only on their ear portions.

Specific examples of the invention will be described below

EXAMPLE 1

FIG. 1 shows a belt-conveyer-type apparatus for producing Chinese fried meat dumpling. In FIG. 1, reference numeral 1 denotes a steel belt conveyer of 1 m in width and 40 m in length made of 1 mm-thick precipitation hardening martensitic stainless steel (corresponds to SUS630 of the JIS standard). A belt in the steel belt conveyer 1 had been subjected to sandblasting so as to have an arithmetic mean roughness value Ra of 3.0 µm. A 3 m portion of the steel belt conveyer 1 immediately toward downstream from the starting position is a dumpling loading zone 2, a 20 m portion downstream therefrom located inside a rectangular steaming room 3 is a steaming zone 4, and a 15 m portion downstream therefrom in which electromagnetic induction heating coils 5 have been provided is a frying zone 6. Driven at a speed of 5 m/min, the belt took four minutes to go through the steaming zone 4 and took three minutes to go through the frying zone 6. Shaped meat dumplings were loaded on the conveyer 1 at the starting position. Before the loading, while shaped meat dumplings were transported from a shaping machine to the conveyer 1 by a transporting device, only their bottom surfaces were brought in contact with hot water of 90° C. for 30 seconds. Pressure-type spray nozzles 7-1 were provided at four positions at the input position and the output position of the steaming zone 4 and two positions dividing the interval between the input position and the output position into three equal sections. With the spray nozzles 7-1, hot water of 90° C. was sprayed at a pressure of 150 kPa at a rate of 0.03 ml/s per 1 $cm^2$ area of the surface of a meat dumpling. Twenty electromagnetic induction heating coils of 10 kW were arranged in the belt moving direction under the top part of the steel belt conveyer 1 in the frying zone 6. The power applied to each coil was adjusted so that the belt temperature became 130° C., 180° C., and 250° C. at positions that were distant from the input position of the frying zone 6 by 5 m, 10 m, and 15 m, respectively. A pressure-type spray nozzle 7-2 was provided at the input position of the frying zone 6, and hot water of 60° C. was sprayed at a pressure of 150 kPa at a rate of 0.02 ml/s per 1 cm2 area of the surface of a meat dumpling. Chinese fried meat dumplings were produced by this apparatus by using meat dumplings produced from a noodle band having a water content of 33% and weighed 20 g each. Table 1 shows water contents of the ear portion and degrees of gelatinization (measured by the β-amylase/pullulanase method) measured after steaming and frying. The bottom surfaces of those meat dumplings had uniform frying results, and the Chinese fried meat dumplings thus produced were equivalent to the ones obtained by the manual cooking.

TABLE 1

|  | Water contents | Degrees of Gelatinization |
| --- | --- | --- |
| After steaming | 58% | 80% |
| After frying | 45% | 87% |

EXAMPLE 2

Figure 2:
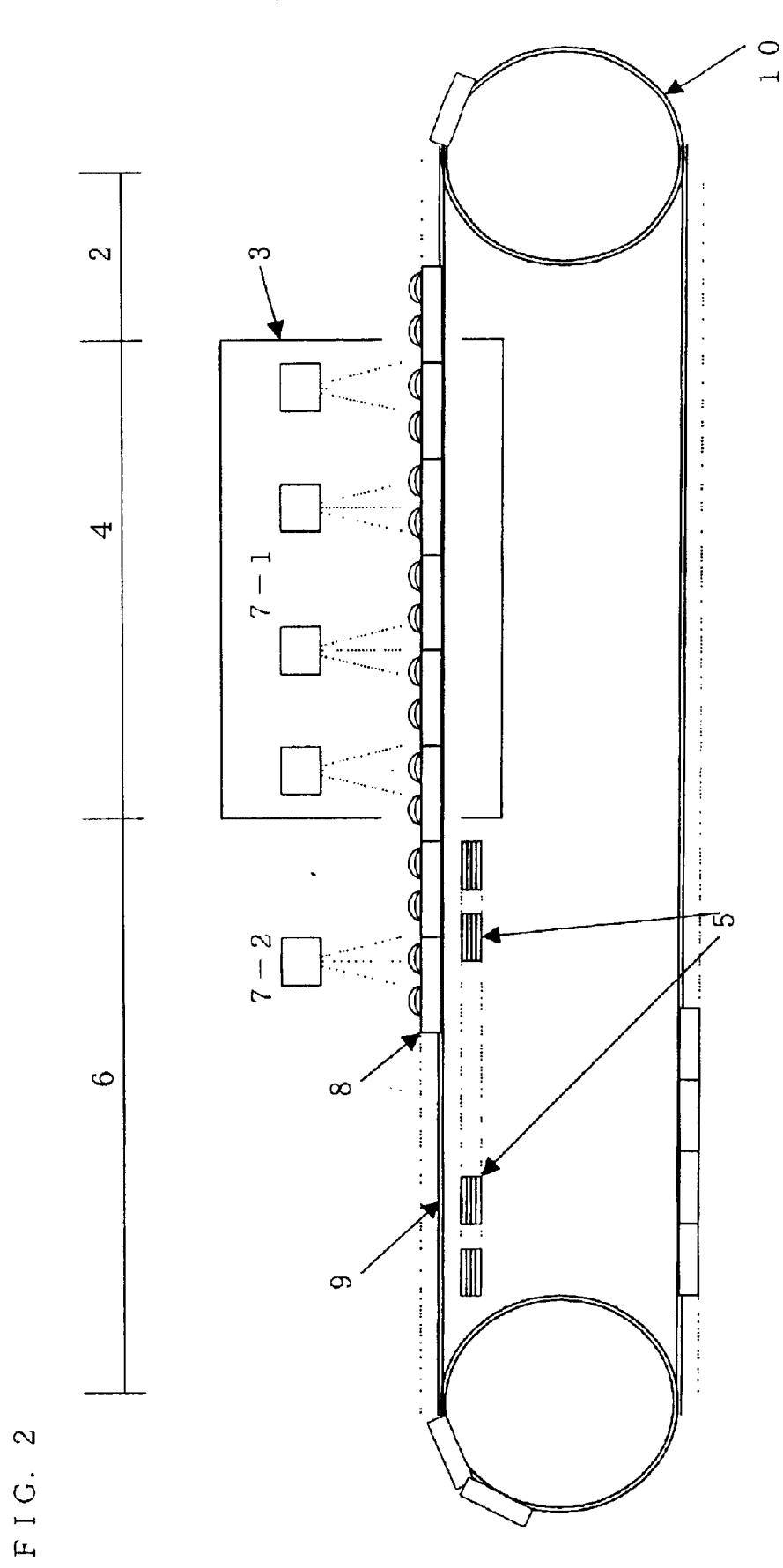
FIG. 2 shows a plate-conveyer-type Chinese fried meat dumpling production apparatus according to another embodiment of the present invention.

FIG. 2 shows a plate-conveyer-type apparatus for producing Chinese fried meat dumpling. Each frying plate 8 was formed by working, into a plate of 200 mm in width and 1 m in length, a cladding steel sheet in which a 1 mm thick pure titanium sheet and a 1 mm thick austenite stainless steel sheet (SUS304) had been clad to the front surface and the back surface, respectively, of a carbon steel sheet (SS400) by explosive cladding. The titanium surface on which the meat dumplings were fried had been polished so as to have an arithmetic mean roughness value Ra of 3.5 µm. Two chains 9 for driving the frying plates 8 extend in the conveyer moving direction. The frying plates 8 were tightly connected to the chains 9 by attachments provided on the chains 9, and the chains 9 were driven by a driving sprocket 10. A 2 m portion of the conveyer immediately toward downstream from the starting position is a dumpling loading zone 2, a 10 m portion toward downstream therefrom is located inside a rectangular steaming room 3 and is a steaming zone 4, and a 10 m portion downstream therefrom in which electromagnetic induction heating coils 5 have been provided is a frying zone 6. Driven at a speed of 2.5 m/min, the chains 9 took four minutes to go through the steaming zone 4 and took four minutes to go through the frying zone 6. Pressure-type spray nozzles 7-1 were provided at four positions at the input position and the output position of the steaming zone 4 and two positions dividing the interval between the input position and the output position into three equal sections. With the spray nozzles 7-1, hot water of 50° C. was sprayed at a pressure of 200 kPa at a rate of 0.05 ml/s per 1 cm2 area of the surface of a meat dumpling. Fifteen electromagnetic induction heating coils of 10 kW were arranged in the chain moving direction under the top part of the conveyer in the frying zone 6. The power applied to each coil was adjusted so that the temperature of a frying plate 8 became 120° C., 170° C., and 240° C. at positions that were distant from the input position of the frying zone 6 by 3 m, 6 m, and 10 m, respectively. Pressure-type spray nozzles 7-2 were provided above the conveyer at three positions, a frying start position, the center, and a frying completion position of the frying zone 6, and in the same number of rows as the number of rows the meat dumplings were arranged in the direction of their ear portions. By detecting approaching meat dumplings with sensors, hot water of 60° C. was sprayed at a pressure of 150 kPa only to the ear portions of the meat dumplings at a rate of 0.01 ml/s per 1 cm2 area of the surface of a meat dumpling. Chinese fried meat dumplings were produced by this apparatus by using meat dumplings produced from a noodle band having a water content of 35% and weighed 20 g each. Table 2 shows water contents of the ear portion and degrees of gelatinization (measured by the β-amylase/pullulanase method) measured after steaming and frying. Table 3 shows sensory evaluation results of the fried conditions of the bottom surfaces. The fried conditions were uniform, and the produced Chinese fried meat dumplings were equivalent to the ones obtained by the manual cooking. The Chinese fried meat dumplings produced in this method were frozen and then defrosted with a microwave oven. The ear portions of the defrosted fried meat dumplings contained a sufficient amount of water and provided a good texture that is equivalent to the texture obtained immediately after frying.

TABLE 2

|  | Water contents | Degrees of Gelatinization |
|---|---|---|
| After steaming | 60% | 87% |
| After frying | 40% | 90% |

TABLE 3

| Sensory Evaluation of Meat Dumpling | | | |
|---|---|---|---|
| Softness of the ear portion | Soft-rice-cake-like feel of the bottom portion | Uniformity of fried surface color of the bottom portion | Crunchy feel of the bottom portion |
| Sample +1 | 0 | +1 | +1 |

Control(0 point): Chinese fried meat dumplings cooked by Manual manner. Sample was evaluated by 5 steps(from −2 to +2), and sample of the good quality have high point.

Even with the meat dumplings formed on an industrial scale with a shaping machine by using a noodle band having a small water content, this exemplary apparatus for producing Chinese fried meat dumpling according to the present invention produced Chinese fried meat dumplings each having a sufficiently soft ear portion and a crunchy fried surface. Furthermore, even when these Chinese fried meat dumplings were once frozen and defrosted with a microwave oven, they provide a texture that is well comparable to the texture obtained immediately after frying.

Obviously, numerous modifications and variations of the present invention are possible in light of the above teachings. It is therefore to be understood that within the scope of the appended claims, the invention may be practiced otherwise than as specifically described herein.

What is claimed is:

1. A production method of Chinese fried meat dumplings, comprising:
   loading meat dumplings on a conveyer;
   steaming the meat dumplings on the conveyer; and
   frying the meat dumplings by increasing a temperature of the conveyer from 50° C. to 200–280° C. in 1–8 minutes as the conveyer moves the meat dumplings toward downstream.

2. The production method according to claim 1, wherein the frying step comprises increasing the temperature of the conveyer at a rate of 0.3–2.0° C./s as the conveyer moves the meat dumplings toward downstream.

3. The production method according to claim 1, wherein the steaming step comprises spraying one of hot water and cool water continuously or intermittently on wrappings of the meat dumplings while steaming at a rate of 0.01–0.1 ml/s per 1-cm$^2$ area of the meat dumplings.

4. The production method according to claim 2, wherein the steaming step comprises spraying one of hot water and cool water continuously or intermittently on wrappings of the meat dumplings while steaming at a rate of 0.01–0.1 ml/s per 1 cm$^2$ area of the meat dumplings.

5. The production method according to claim 1, further comprising bringing bottom surface portions of the meat dumplings in contact with hot water of 50–90° C. for 20–60 seconds before the meat dumplings are loaded on the conveyer.

6. The production method according to claim 2, further comprising bringing bottom surface portions of the meat dumplings in contact with hot water of 50–90° C. for 20–60 seconds before the meat dumplings are loaded on the conveyer.

7. The production method according to claim 3, further comprising bringing bottom surface portions of the meat dumplings in contact with hot water of 50–90° C. for 20–60 seconds before the meat dumplings are loaded on the conveyer.

8. The production method according to claim 4, further comprising bringing bottom surface portions of the meat dumplings in contact with hot water of 50–90° C. for 20–60 seconds before the meat dumplings are loaded on the conveyer.

9. The production method according to claim 1, wherein the frying step comprises spraying water on folded portions of the meat dumplings while frying at a rate of 0.01–0.1 ml/s per 1 cm$^2$ area of the meat dumplings.

10. The production method according to claim 2, wherein the frying step comprises spraying water on folded portions of the meat dumplings while frying at a rate of 0.01–0.1 ml/s per 1 cm$^2$ area of the meat dumplings.

11. The production method according to claim 3, wherein the frying step comprises spraying water on folded portions of the meat dumplings while frying at a rate of 0.01–0.1 ml/s per 1 cm$^2$ area of the meat dumplings.

12. The production method according to claim 4, wherein the frying step comprises spraying water on folded portions of the meat dumplings while frying at a rate of 0.01–0.1 ml/s per 1 cm$^2$ area of the meat dumplings.

13. The production method according to claim 5, wherein the frying step comprises spraying water on folded portions of the meat dumplings while frying at a rate of 0.01–0.1 ml/s per 1 cm$^2$ area of the meat dumplings.

14. The production method according to claim 6, wherein the frying step comprises spraying water on folded portions of the meat dumplings while frying at a rate of 0.01–0.1 ml/s per 1 cm² area of the meat dumplings.

15. The production method according to claim 7, wherein the frying step comprises spraying water on folded portions of the meat dumplings while frying at a rate of 0.01–0.1 ml/s per 1 cm² area of the meat dumplings.

16. The production method according to claim 8, wherein the frying step comprises spraying water on folded portions of the meat dumplings while frying at a rate of 0.01–0.1 ml/s per 1 cm² area of the meat dumplings.

17. The production method according to claim 1, wherein the conveyer is one of a steel belt conveyer having a frying surface and a plate conveyer having a plurality of frying plates.

18. The production method according to claim 1, wherein the conveyer has at least one frying surface whose arithmetic mean roughness is between 1.2 $\mu$m and 5.0 $\mu$m.

19. The production method according to claim 1, wherein the conveyer comprises a plurality of electromagnetic induction heating coils for heating at least one frying surface.

20. The production method according to claim 1, wherein the conveyer comprises a loading section for the loading step, a steaming section for the steaming step, and a frying section for the frying step sequentially toward downstream.

* * * * *

UNITED STATES PATENT AND TRADEMARK OFFICE
CERTIFICATE OF CORRECTION

PATENT NO. : 6,818,242 B2
DATED : November 16, 2004
INVENTOR(S) : Sada et al.

It is certified that error appears in the above-identified patent and that said Letters Patent is hereby corrected as shown below:

<u>Title page,</u>
Item [75], Inventors, should read:
-- [75]  Inventors:    Morihiro Sada, Kawasaki (JP)
                       Yukiyo Yoshida, Kawasaki (JP)
                       Eri Hoshikawa, Kawasaki (JP)
                       Tomoyuki Hirota, Kawasaki (JP)
                       Shundo Harada, Kawasaki (JP)
                       Chiaki Nosaka, Kawasaki (JP)
                       Takeshi Nishinomiya, Oura-gun (JP)
                       Hirofumi Terazaki, Oura-gun (JP)
                       Masata Mitsuiki, Oura-gun (JP)
                       Takashi Futatsugi, Kawasaki (JP)--

Signed and Sealed this

First Day of February, 2005

JON W. DUDAS
*Director of the United States Patent and Trademark Office*